United States Patent [19]

Ishikawa

[11] 4,102,616
[45] Jul. 25, 1978

[54] ROTARY PISTON INTERNAL COMBUSTION ENGINE AND ROTOR THEREOF

[75] Inventor: Yoshikazu Ishikawa, Chofu, Japan

[73] Assignee: Nissan Motor Company, Ltd., Japan

[21] Appl. No.: 686,315

[22] Filed: May 14, 1976

[30] Foreign Application Priority Data

Jun. 2, 1975 [JP] Japan .............................. 50-75126[U]

[51] Int. Cl.² .............................................. F02B 55/04
[52] U.S. Cl. ................................................... 418/91
[58] Field of Search ................ 123/8.01, 8.45; 418/91, 418/94

[56] References Cited

U.S. PATENT DOCUMENTS

| | | | |
|---|---|---|---|
| 3,165,259 | 1/1965 | Muller et al. | 418/91 |
| 3,444,842 | 5/1969 | Bensinger et al. | 418/91 X |
| 3,469,505 | 9/1969 | Bensinger | 92/177 |
| 3,995,602 | 12/1976 | Burley | 123/8.45 |

*Primary Examiner*—Carlton R. Croyle
*Assistant Examiner*—Michael Koczo, Jr.
*Attorney, Agent, or Firm*—Lowe, King, Price & Markva

[57] ABSTRACT

A rotary piston internal combustion engine of the epitrochoidal type is provided with means whereby the cooling effect of a cooling liquid medium on a trailing chamber portion of the combustion chamber is reduced or eliminated. Thus a tendency that the mixture portion within the trailing chamber portion is discharged unburned with the exhaust is eliminated, thus improving the fuel economy and HC control in the exhaust.

7 Claims, 3 Drawing Figures

ROTARY PISTON INTERNAL COMBUSTION ENGINE AND ROTOR THEREOF

The present invention relates to a rotary piston internal combustion engine and a rotor thereof, and more particularly to means for securing between combustion and reducing the proportion of unburned hydrocarbons released to the atmosphere in the exhaust.

The combustion chamber of the epitrochoidal type rotary piston internal combustion engine has an axial length fixed by the spacing of the end walls between which the rotor turns, and its volume is varied by cyclical variation in the distance between the working face of the rotor and the inner surface of the peripheral wall. This means that the chamber is essentially rectangular in cross-section as viewed transversely to the axis, and at certain portions of the cycle the rectangular section becomes proportionally very long and thin, but with the chamber having considerable extent in the peripheral direction. Thus there is produced a chamber portion in which the confining boundaries have a very large proportion of surface area to the volume of the chamber, or a local quench zone.

Such a configuration occurs particularly in the trailing portion of the combustion chamber shortly after ignition is initiated. At that portion of the cycle the flame front does not readily travel backward in the direction opposed to rotor rotation, to the trailing portion of the chamber, and there is a tendency of the wall surface to quench combustion in that area. The result of such quenching is that the unvaporized fuel in the trailing chamber portion is cooled below combustion temperature or the fuel may condense and deposit on the walls, is then swept along by the sealing system, and is finally discharged in the unburned state with the exhaust.

The peculiarly flat configuration of the combustion chamber at a quench zone is brought about by the necessary epitrochoidal shape of the peripheral housing wall, and the approach of the trailing portion of the rotor working face to parallelism therewith shortly before crossing the cusp of the epitrochoid just after combustion is initiated and while there is still a considerable quantity of unignited fuel mixture in the chamber.

The present invention solves the problem by modifying the cooling arrangement within the interior of the rotor in the regions of the trailing apexes to reduce in those portions the amount of heat transfer from a trailing chamber portion to the liquid cooling medium. Thus the fuel in the trailing chamber portion is vaporized enough to reduce quenching in this area.

It is therefore a primary object of the present invention to provide means of improving combustion efficiency in a rotary piston internal combustion engine of the epitrochoidal type.

It is another object of the present invention to reduce the proportion of unburned hydrocarbons emitted in the exhaust of a rotary piston internal combustion engine of the epitrochoidal type.

A further object of the present invention is to approach complete combustion in the trailing portion of the chamber of a rotary piston internal combustion engine of the epitrochoidal type.

Still another object of the present invention is to provide a rotor which has an improved cooling arrangement with regard to the efficiency of the engine.

Other objects and advantages of the present invention will become apparent from the following description in connection with the accompanying drawings, in which.

Figure 1:
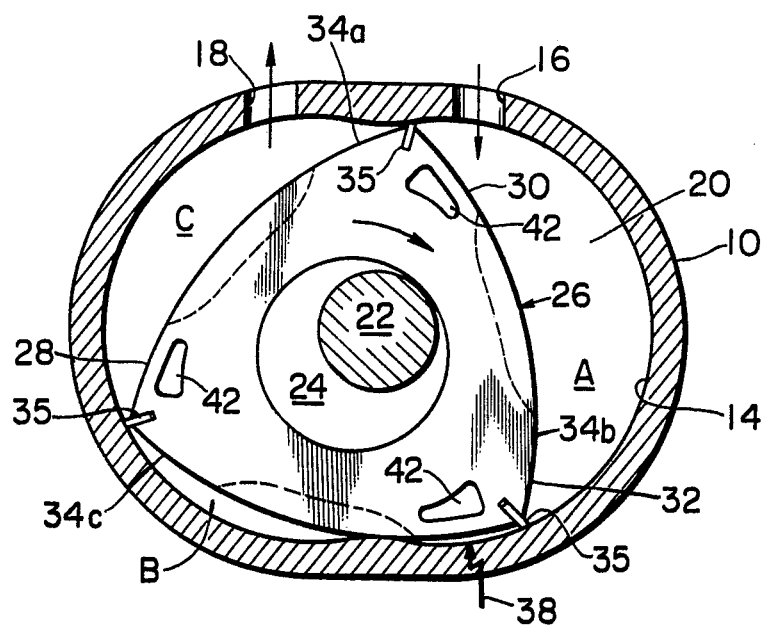
FIG. 1 is a cross-sectional elevation of a rotary piston internal combustion engine of the epitrochoidal type according to the present invention.
Figure 3:
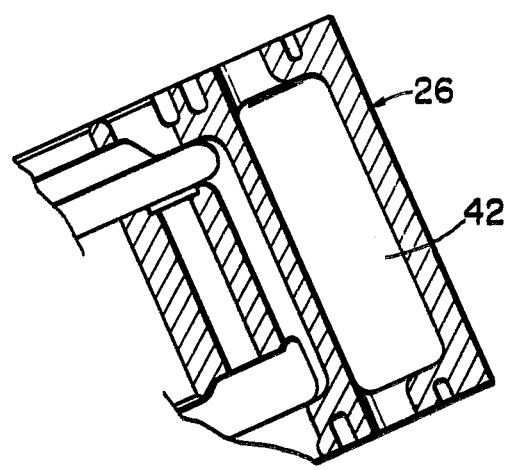
FIG. 3 is a section taken through line III—III of FIG. 2.

Referring to FIG. 1, there is shown a peripheral housing 10 having a two-lobed basically epitrochoidal inner surface 14, an inlet port 16, and an exhaust port 18. End walls 20 (of which only one is shown) are provided to complete the outer body. A shaft 22 transpierces the end walls on the outer body axis and bears within the cavity of the outer body an eccentric portion 24 on which is rotatably mounted a generally polygonal rotor 26 having parallel end faces and three apex portions 28, 30 and 32 with convexly arcuate working faces 34a, 34b and 34c extending between adjacent apex portions.

The rotor 26 has a profile in the axial direction which approximates the inner envelope of the epitrochoidal housing within which it operates. A trough-like recess is provided in each rotor working face to transfer gases across the cusp of the epitrochoid. An apex seal 35 is mounted in a groove 36 at each apex of the rotor, sweeping the epitrochoidal inner surface in sealing relation therewith and isolating from each other variable volume working chambers A, B and C defined by the outer body and the rotor. A spark plug is schematically indicated by the arrow 38.

In FIG. 1 chamber A is intaking, chamber C is exhausting and chamber B is in the process of combustion and expansion. Each chamber is normally fired shortly before the rotor working face reaches dead center. As shown in the drawing, the rotor has turned in the direction indicated by the arrow after ignition, whereupon the trailing portion of the rotor working face 34c, near apex 35, has reached a position of near-parallelism with the peripheral wall, shortly before the trailing apex 35 crosses the cusp of the epitrochoid, producing a quench zone in the trailing portion of chamber B.

Figure 2:
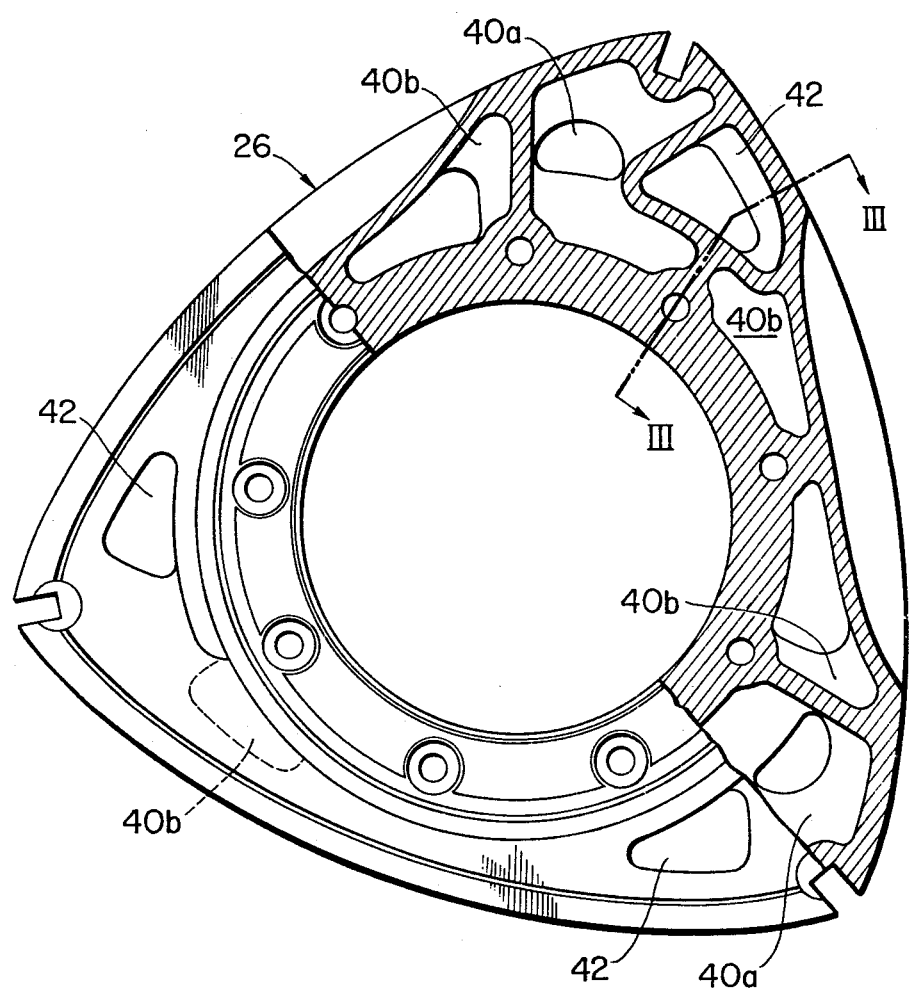
FIG. 2 is an elevation, halfly in section, of the rotor of the present invention.

To cool the interior of the rotor 26, the interior of the rotor is partitioned into a plurality of discrete compartments 40a and 40b (FIG. 2). The compartment 40a is provided at a region adjacent each of the apex portions 28, 30 and 32, while the compartments 40b are provided at a region adjacent each of the working faces 34a, 34b and 34c. Compartments 40a and 40b are supplied with cooling liquid medium to cool the rotor 26. A compartment 42 is provided at a region adjacent each of the trailing portions of the working faces 34a, 34b and 34c. The compartment 42 is not supplied with the cooling liquid medium and is open at the end faces of the rotor 26 to permit blowby gas to flow therethrough. The compartment 42 functions to reduce cooling effect of the cooling liquid medium on each of the trailing portions of the working faces to hold the trailing portion of chamber B at elevated temperatures to facilitate vaporization of the fuel therein. The dimensional proportions of the compartments 42 are determined depending on the desired performance of the epitrochoid engine. The compartments 42 can be utilized as holes through which casting cores are supported during casting of the rotor 26.

Upon initiation of combustion within chamber B as the rotor 26 reaches a position before the top dead center, the combustion takes place at a region within the leading portion of the working chamber. The flame front travels forwardly as the trailing chamber portion is contracted because the mixture flows forwardly. This flow of the mixture is eliminated during the expansion cycle and the trailing chamber portion is exposed to the flame front. The mixture portion within the trailing chamber portion can burn immediately because the trailing chamber portion is maintained at elevated temperature due to the provision of compartment 42.

It will now be appreciated from the preceding that because the mixture supplied to the working chamber is burned well without unburned contents in its exhaust, the fuel economy as well as the reduction of unburned hydrocarbons in the exhaust are achieved.

What is claimed is:

1. A rotary piston internal combustion engine comprising:
   means for supplying a cooling liquid medium to the engine;
   an outer body having a pair of spaced end walls and a peripheral wall disposed between the end walls to form a cavity therebetween having an axis along which said end walls are spaced, the inner surface of said peripheral wall having a multilobed profile of basically epitrochoidal outline;
   a shaft transpiercing said end walls coaxially with said outer body cavity and having an eccentric portion disposed within said cavity;
   a rotor journaled on said eccentric portion for rotation within said cavity;
   said rotor having a generally polygonal profile with a plurality of apex portions and having a plurality of working faces each extending between two adjacent apexes and bounded axially by the end faces of said rotor, said working faces defining with said outer body a plurality of variable volume working chambers;
   each of said working faces having a leading portion in the direction of rotor rotation and a trailing portion opposite thereto;
   a portion of said rotor being connected in fluid flow relation with the supplying means so that there is a heat exchange between the liquid medium and the rotor whereby the liquid medium has a tendency to cool each trailing portion; and
   at least one compartment means provided on said rotor adjacent a region of each of said trailing portions of said working faces and adapted for reducing the cooling effect of the cooling liquid medium on each trailing portion.

2. A rotary piston internal combustion engine as claimed in claim 1, in which each of said compartment means is open at the end faces of said rotor.

3. A polygonal rotor for a rotary piston internal combustion engine comprising:
   a plurality of apex portions;
   a plurality of working faces each extending between two adjacent apex portions and bounded axially by the end faces of the rotor;
   each of said working faces having a leading portion in the direction of rotor rotation and a trailing portion opposite thereto;
   first compartment means beneath said apex portions adapted for receiving a cooling liquid medium to cool said apex portions;
   second compartment means beneath the trailing portions of said working faces for reducing the effect of the cooling liquid medium on the trailing portions; and
   third compartment means beneath the remaining portions of said working faces including the leading portions.

4. A polygonal rotor as claimed in claim 3, in which each of said second compartment means is open at the end faces of said rotor.

5. a rotary piston internal combustion engine comprising:
   an outer body having a pair of spaced end walls and a peripheral wall disposed between the end walls to form a cavity therebetween having an axis along which said end walls are spaced, the inner surface of said peripheral wall having a multilobed profile of basically epitrochoidal outline;
   a shaft transpiercing said end walls coaxially with said outer body cavity and having an eccentric portion disposed within said cavity;
   a rotor journaled on said eccentric portion for rotation within said cavity;
   said rotor having a generally polygonal profile with a plurality of apex portions and having a plurality of working faces each extending between two adjacent apexes and bounded axially by the end faces of said rotor, said working faces defining with said outer body a plurality of variable volume working chambers;
   each of said working faces having a leading portion in the direction of rotor rotation and a trailing portion opposite thereto;
   means for supplying a cooling liquid medium to the rotor, said cooling liquid medium having a tendency to cool the trailing portion of the working faces so that there is a tendency for the trailing portion to quench combustion as it traverses the cavity; and
   means for supplying heat to the rotor adjacent the trailing portion of the working face to reduce the tendency of the trailing portion to quench combustion, the means for supplying heat including a compartment means on said rotor adjacent a region of each of said trailing portions.

6. The engine of claim 5 wherein each of said compartment means is open at the end faces of the rotor so blow-by gas flows through it to heat each of the trailing portions.

7. A method of operating a rotary piston internal combustion engine, said engine including:
   an outer body having a pair of spaced end walls and a peripheral wall disposed between the end walls to form a cavity therebetween having an axis along which said end walls are spaced, the inner surface of said peripheral wall having a multilobed profile of basically epitrochoidal outline;
   a shaft transpiercing said end walls coaxially with said outer body cavity and having an eccentric portion disposed within said cavity;
   a rotor journaled on said eccentric portion for rotation within said cavity;
   said rotor having a generally polygonal profile with a plurality of apex portions and having a plurality of working faces each extending between two adjacent apexes and bounded axially by the end faces of said rotor, said working faces defining with said outer body a plurality of variable volume working chambers;

each of said working faces having a leading portion in the direction of rotor rotation and a trailing portion opposite thereto;

the method comprising:

cooling the interior of the rotor by supplying a cooling liquid medium to the rotor, said cooling liquid medium having a tendency to cool the trailing portion of the working faces so that there is a tendency for the trailing portion to quench combustion as it traverses the cavity; and heating the portion of the rotor adjacent the trailing portion of the working face by supplying blow-by gas to a compartment in the rotor adjacent each of the trailing portions, thereby to reduce the tendency of the trailing portion to quench combustion.

* * * * *